_United States Patent_ [19]

Meyer et al.

[11] 4,104,228

[45] Aug. 1, 1978

[54] LINEAR, PARTIALLY DEACYLATED POLY(N-ACYL)ALKYLENIMINES AS TANNIN MIGRATION INHIBITORS

[75] Inventors: Victor E. Meyer; Kenneth M. Kem, both of Midland, Mich.

[73] Assignee: The Dow Chemical Company, Midland, Mich.

[21] Appl. No.: 754,398

[22] Filed: Dec. 27, 1976

[51] Int. Cl.$^2$ .............................................. C08L 79/00
[52] U.S. Cl. ...................... 260/29.6 NR; 260/29.2 N; 427/408; 428/511; 428/537; 528/404
[58] Field of Search ...... 260/2 EN, 29.2 N, 29.6 NR; 427/408, 428/537, 511

[56] References Cited

U.S. PATENT DOCUMENTS

| 3,373,194 | 3/1968 | Fuhrman et al. | 260/2 EN |
|---|---|---|---|
| 3,450,557 | 6/1969 | Dratz et al. | 260/29.6 NR |
| 3,483,141 | 12/1969 | Litt et al. | 260/2 EN |
| 3,483,145 | 12/1969 | Levy et al. | 260/2 EN |
| 3,597,265 | 8/1971 | Mecklenborg et al. | 260/29.6 NR |
| 3,758,641 | 9/1973 | Zweigle | 260/29.6 NR |
| 3,847,857 | 11/1974 | Haag et al. | 260/29.6 RW |

_Primary Examiner_—Eugene C. Rzucidlo
_Attorney, Agent, or Firm_—G. R. Plotecher

[57] ABSTRACT

Tannin migration through a latex paint applied to a tannin-containing wood surface is inhibited by applying to the wood surface a linear, partially deacylated poly(N-acyl)alkylenimine, such as poly(N-propionyl)ethylenimine. The poly(N-acyl)alkylenimine can be applied to the wood surface either prior to or concurrently with the latex paint.

12 Claims, No Drawings

LINEAR, PARTIALLY DEACYLATED POLY(N-ACYL)ALKYLENIMINES AS TANNIN MIGRATION INHIBITORS

BACKGROUND OF THE INVENTION

1. Field of the Invention

This invention relates to tannin-containing wood substrates. In one aspect, this invention relates to a latex paint applied to the surface of said substrate. In another aspect, this invention relates to a method of inhibiting tannin migration through the latex paint. In yet another aspect, this invention relates to the use of a poly(N-acyl)alkylenimine as a tannin migration inhibitor.

2. Description of the Prior Art

Harren et al., U.S. Pat. No. 3,494,878, teach incorporating an ion exchange resin into an aqueous coating composition comprised of a dispersed emulsion polymer of vinyl addition type and applying the combination to cedar and redwood type substrates. The ion exchange resin is highly cross-linked.

Nordyke et al., U.S. Pat. No. 3,852,087, teach a method of inhibiting the migration of water-soluble tannins through a paint film applied to a tannin-containing wood by incorporating doping agents into certain composite pigments. Enumerated doping agents included the amphoteric compounds of alumina, titania, zirconium, silica or zinc.

Lalk et al., U.S. Pat. No. 3,900,619, teach inhibiting tannin migration through a latex paint applied to the surface of a tannin-containing wood substrate by applying to the substrate a water-soluble S-arylcycloaliphatic sulfonium compound. These sulfonium compounds can be applied to the wood substrate either prior to or concurrently with the application of the latex paint.

Meyer, "Process of Inhibiting Tannin Migration In Tannin-Containing Wood Substrates", Ser. No. 674,789 and filed Apr. 8, 1976, now U.S. Pat. No. 4,075,394 (Feb. 21, 1978), teaches inhibiting tannin migration in tannin-containing wood substrates by applying to the substrate an aqueous solution of a polyalkylenimine, such as polyethylenimine.

SUMMARY OF THE INVENTION

According to this invention, tannin migration through a latex paint applied to a tannin-containing wood surface is inhibited by the novel method comprising applying to the wood surface an inhibiting amount of a linear, partially deacylated poly(N-acyl)alkylenimine (PAAI) having a weight average molecular weight of at least about 10,000. PAAI can be applied to the wood surface either prior to or concurrently with the latex paint. Moreover, high (above 50,000) molecular weight and high (above 20 percent) deacylated PAAI also has desirable thickening properties.

DETAILED DESCRIPTION OF THE INVENTION

PAAI's are known compounds (I) and are readily prepared by the ring-opening polymerization of substituted oxazolines (II) followed by hydrolysis.

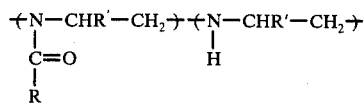

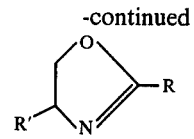

The substituents are later defined. The ring-opening polymerization is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, borontrifluoride, and organic diazoniumfluoroborates, dialkyl sulfates, and other like catalysts. This ring-opening polymerization is further described by Tomalia et al., J. Polymer Science, 4, 2253 (1966); Bassiri et al., Polymer Letters 5, 871 (1967); and Seeliger, German Pat. No. 1,206,585.

The pre-hydrolyzed polymers thereby obtained are linear N-acylated polyalkylenimines having a molecular structure consisting essentially of repeating units of the formula

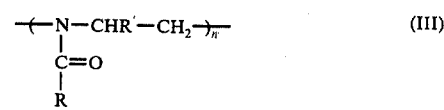

These polymers are easily deacylated by acid, base or neutral hydrolysis. Hydrolysis (deacylation) is best controlled under acidic conditions and acid hydrolysis is thus preferred. The partially deacylated PAAI's have a molecular structure consisting essentially of repeating units of the formula

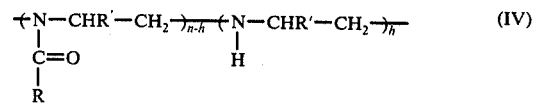

wherein $n$ (for both III and IV) is the total number of units, $h$ is the number of deacylated units, and $n-h$ is the number of acylated units. R' is typically hydrogen or R, and R is typically an alkyl or an inertly-substituted alkyl radical of 1–3 carbon atoms. The combined carbon content of R and R' generally does not exceed 4 alkyl carbon atoms. R and R' alkyl or inertly substituted alkyl radicals of 4 or more carbon atoms or of a combined alkyl carbon content of 5 or more carbon atoms diminish generally the water solubility of the PAAI polymer, thus diminish generally the polymer's compatibility with latex patent systems, and are thus generally disfavored. However, if R and R' have sufficient hydrophilic, inert substituents, such as ether oxygen, carbonyl, ester, etc., to render the PAAI polymer sufficiently water-soluble to be compatible with a latex paint system, then R and R' can favorably be alkyl radicals of 4 or more carbon atoms or can favorably have a combined alkyl carbon content of 5 or more carbon atoms. For reasons of water solubility and economics, PAAI's where R' is hydrogen and R is an alkyl radical of 1–3 carbon atoms are preferred. Poly(N-propionyl)- and poly(N-butyroyl) ethylenimine are most preferred.

By such terms as "inertly-substituted," "inert substituent" and the like is meant that the substituents are inert to the PAAI's tannin migration inhibition properties. In addition to the hydrophilic substituents mentioned above, other illustrative inert substituents include halogen, ethylenic unsaturation, sulfide, nitrile, etc.

PAAI's having a weight average molecular weight of at least about 10,000, as determined by gel permeation chromatography, are used in the practice of this invention. Typically, the PAAI's here used have an average minimum molecular weight of about 20,000 and preferably of about 40,000. Practical considerations, such as solubility in water, mechanical application, and the like are the only limitations upon the PAAI's average maximum molecular weight although convenience prefers a maximum of about 200,000.

The PAAI's of this invention are also partially deacylated. PAAI's that are at least about 10 percent deacylated are preferred and those that are at least 15 percent deacylated are most preferred. Again, practical considerations, particularly solubility in water, are the only limitations upon the PAAI's maximum deacylation. About 80 percent, and preferably about 40 percent deacylated PAAI's are generally used.

In the practice of this invention, an inhibiting amount of one or more PAAI's is dissolved in an aqueous medium and the resulting solution is applied to a tannin-containing wood substrate in any conventional manner, e.g., brushing, rolling, spraying, dipping, impregnating, etc. The aqueous medium can be water per se or it can be an aqueous solution or dispersion comprising other materials, such as pigments and/or sealers. The concentration of the PAAI in solution and the amount of solution applied can be varied widely, depending upon the wood substrate and the degree of inhibition desired. Satisfactory results are generally obtained at a PAAI concentration of at least about 0.5 weight percent, and preferably of about 1 weight percent. A maximum concentration of about 5 weight percent, and preferably of about 2 weight percent, is generally employed although practical considerations, particularly economics, are the only true maximum limitations.

Preferably this invention is practiced by adding one or more PAAI compounds, typically in an aqueous solution, to a latex paint prior to applying the paint to the wood substrate. The resulting latex paint contains at least about 0.5 weight percent, and preferably about 1 weight percent, PAAI. Again, only practical considerations limit the maximum PAAI weight percent that can be blended with the latex paint, but generally about 5, and preferably about 2, PAAI weight percent is used. Substantially any latex paint that is useful on wood surfaces can be used, the most common types being those based on polymeric esters of acrylic and/or methacrylic acid or on polyvinylacetate.

PAAI's of high molecular weight (above 50,000) and high deacylation (above 20 percent) also have desirable thickening properties. As such, these PAAI's can serve to displace some or all of the methylcellulose currently used as a thickening agent in latex paint. PAAI's can thus serve a two-fold function, tannin migration inhibition and thickening, thereby allowing certain economies to be achieved that were heretofore unavailable.

The term "tannin-containing wood substrate" is intended to include wood, wood composites and wood-derived products containing water-soluble tannins. Any wood substrate capable of receiving an application of an aqueous PAAI can be used in the practice of this invention. Typical examples include: wood, such as redwood, cedar and mahogany; wood composites, such as particle and fiberboard and plywood; and wood-derived products, such as veneer and paper.

The following examples are illustrative of certain specific embodiments of the invention. Unless otherwise noted, all parts and percentages are by weight.

SPECIFIC EMBODIMENTS

EXAMPLE 1

Viscosity

The Brookfield viscosities of the following materials were measured:

A. K-65, a commercial white exterior acrylic paint of pH 8.5 manufactured by General Paint and Chemical Co.;

B. a uniform mixture of K-65 (400 g) and poly(N-propionyl)ethylenimine (PNPEI) (28.1 g) having a weight average molecular weight of 320,000 and 59 percent hydrolyzed (deacylated);

C. the uniform mixture of B after aging 24 hours under ambient conditions; and

D. a uniform mixture similar to B but with sufficient ammonium hydroxide to raise the pH to 9.8.

The viscosities were measured with a No. 3 spindle and are reported in Table I.

TABLE I

Brookfield RVT Viscosities of K-65 and as Modified with PNPEI

| RPM[1] | K-65 (pH=8.5) | K-65 & PNPEI (pH=9.2) | K-65 & PNPEI 24 hrs. Subsequent | K-65 & PNPEI with NH$_4$OH (pH=9.8) |
|---|---|---|---|---|
| 20.0 | 3,310 | — | — | — |
| 10.0 | 4,900 | — | — | 8,670 |
| 5.0 | 7,440 | 15,520 | — | 12,420 |
| 2.5 | 11,920 | 23,000 | 38,600 | 17,840 |
| 1.0 | 22,400 | 41,200 | 70,400 | 29,700 |
| 0.5 | 40,200 | 63,800 | 114,600 | 46,000 |

[1]Revolutions per minute.

A comparison of columns 3 and 4 substantiates the thickening property of PNPEI while a comparison of columns, 3, 4 and 5 illustrates further thickening with time. This thickening property can be advantageous in that PNPEI-containing paints prepared from scratch will require relatively less thickener, e.g., methylcellulose. For prepared paints, viscosity control is readily had by increasing the pH, as illustrated in column 6.

EXAMPLE 2

Tannin Migration Inhibition

In this and the following examples, a Hunterlab Reflectometer was used to determine the yellowness (Y) and whiteness (W) of the various samples from the intensity of the blue (B) and green (G) reflectances according to the following formulae:

Y is equal to G — B

W is equal to 4B — 3G.

The greater the W value and/or the lesser the Y value, the more tannin migration has been inhibited and vice versa. The reflectometer is described in detail by Hunter in "New Reflectometer and Its Use for Whiteness Measurements", *J. Opt. Soc. Am.*, 50, p. 44 (1960). Since tannin migration varies from board to board, comparative tests were performed on samples of the same board.

Redwood boards were used as the tannin-containing wood substrate. A coat of the uniform mixture of B in Example 1 was applied (brushed) to a portion of the board and permitted to dry. Thereafter, a coat of unmodified K-65 was applied (brushed) normal to a portion of the primer coat and it too was permitted to dry. The board was then sequentially aged overnight, exposed to 1½ hours of rain cycle in a Weather-O-Meter ®, and exposed to 1 week of 90 percent relative humidity and 90° F in a tropical humidity chamber. After each exposure Reflectometer readings were taken and these readings are reported in Table II.

TABLE II

Hunterlab Reflectometer Measurements for PNPEI-Modified K-65 Primer Coat and K-65 Top Coat

| Latex System | Overnight Aging | Weather-O-Meter ® Rain Cycle-3/2 hr | Tropical Chamber 1 week |
|---|---|---|---|
| PNPEI-Modified K-65 Primer Coat | Y = 8.3<br>W = 40 | Y = 10<br>W = 32 | Y = 14.1<br>W = 15.2 |
| Unmodified K-65 Top Coat | Y = 3.1<br>W = 69.5 | Y = 4.3<br>W = 63.6 | Y = 5.7<br>W = 58.1 |

The above data demonstrates that tannin migration through the primer latex coat is significantly inhibited.

EXAMPLE 3

Tannin Migration Inhibition

Example 2 was repeated except that one-half of a redwood board was first primed (brushed) with a 2 percent aqueous PNPEI solution. The yellowness and whiteness values of the various latex coats are reported in Table III.

TABLE III

Hunterlab Reflectometer Measurements for PNPEI-Primed Wood Surface Subsequently Covered With Primer and Top Coats

| Latex System | Overnight Aging | Weater-O-Meter ® Rain Cycle-3/2hr | Tropical Chamber 1-Week |
|---|---|---|---|
| Unmodified K-65 over Unprimed Surface and PNPEI-Modified K-65 Primer Coat | Y = 3.1<br>W = 67.9 | Y = 4.0<br>W = 66.0 | Y = 6.8<br>W = 49.3 |
| Unmodified K-65 over Primed Surface and PNEPI-Modified K-65 Primer Coat | Y = 1.9<br>W = 74.4 | Y = 3.8<br>W = 65.8 | Y = 7.1<br>W = 51.7 |
| PNPEI-Modified K-65 Primer Coat over Unprimed surface | Y = 4.8<br>W = 51.1 | Y = 7.7<br>W = 27.5 | Y = 10.1<br>W = 16.8 |
| PNPEI-Modified K-65 Primer Coat over Primed Surface | Y = 5<br>W = 52.7 | Y = 6.9<br>W = 35.3 | Y = 11.4<br>W = 18.7 |

A comparison of the primed and unprimed whiteness values reveals less tannin migration through the latex coats applied to the primed areas.

EXAMPLE 4

Molecular Weight Variation

The PNPEI's listed in Table IV were individually blended with portions of K-65 to form uniform mixtures having 1 percent of the respective PNPEI (based on the total weight of paint). These mixtures, i.e., primers, were then brushed on a light and on a dark piece of redwood board at 10 mils and permitted to dry. Subsequently, unmodified K-65 was brushed normal onto the primer coats, allowed to dry and then each primer and topcoat subjected to Hunterlab Reflectometer Measurement. The results are recorded in Tables V and VI.

TABLE IV

PNPEI's Blended with K-65 to Form Example 4 Primer Paints

| Reference | Weight Average Molecular Weight | Hydrolyzed (%) |
|---|---|---|
| A | 20,000 | 34 |
| B | 50,000 | 19 |
| C | 102,000 | 19 |
| D | 207,000 | 19 |
| E | 320,000 | 59 |

TABLE V

Hunterlab Reflectometer Measurements on Light Colored Redwood Board

| | Primer Coat | | Top Coat | |
|---|---|---|---|---|
| Reference | W | Y | W | Y |
| A | 57.2 | 6.2 | 71.6 | 3.2 |
| B | 64.7 | 4.7 | 74.4 | 2.8 |
| C | 62.8 | 4.9 | 73.4 | 3.0 |
| D | 65.1 | 4.6 | 74.5 | 2.8 |
| E | 55.8 | 6.8 | 75.7 | 2.5 |
| K-65* | 64 | 4.8 | 73.1 | 3.0 |

*Both primer and top coats unmodified

TABLE VI

Hunterlab Reflectometer Measurements on Dark Colored Redwood Board

| | Primer Coat | | Top Coat | |
|---|---|---|---|---|
| Reference | W | Y | W | Y |
| A | 39.3 | 7.3 | 55.9 | 5.9 |
| B | 40.7 | 6.8 | 61.7 | 4.6 |
| C | 42.7 | 6.5 | 67.9 | 3.4 |
| D | 43.0 | 6.4 | 60.8 | 5.0 |
| E | 26.2 | 10.7 | 69.4 | 3.3 |
| K-65* | 41.1 | 4.9 | 50.6 | 6.3 |

*Both primer and top coats unmodified

The data of Tables V and VI demonstrate that in each case the PNPEI-Modified K-65 latex paint is superior to the unmodified paint as regards tannin migration inhibition through a latex paint coating. Although best results were obtained with a PNPEI additive of 320,000 molecular weight and 59 percent hydrolyzed, acceptable results were obtained with PNPEI-additives at 20,000 molecular weight and 34 percent hydrolyzed and 50,000 molecular weight and 19 percent hydrolyzed.

While the invention has been described with specific reference to particular embodiments, it is to be understood that it is not to be limited thereto but is to be construed bodily and restricted solely by the scope of the appended claims.

What is claimed is:

1. A method of inhibiting tannin migration through a latex paint applied to a tannin-containing wood surface, the method comprising applying to the wood surface a latex paint blended with an inhibiting amount of a linear, water-soluble, partially deacylated poly(N-acyl)alkylenimine having a weight average molecular weight of at least about 10,000.

2. The method of claim 1 wherein between about 0.5 and about 5 weight percent, inclusive, of the poly(N-acyl)alkylenimine is blended with the latex paint.

3. The method of claim 1 wherein between about 1 and about 2 weight percent, inclusive, of the poly(N-acyl)alkylenimine is blended with the latex paint.

4. The method of claim 2 wherein the poly(N-acyl)alkylenimine has a weight average molecular weight between about 20,000 and about 400,000.

5. The method of claim 3 wherein the poly(N-acyl)alkylenimine has a weight average molecular weight between about 40,000 and about 200,000.

6. The method of claim 4 wherein the poly(N-acyl)alkylenimine is between about 10 percent and about 80 percent deacylated.

7. The method of claim 6 wherein the poly(N-acyl)alkylenimine is between about 15 percent and about 40 percent deacylated.

8. The method of claim 6 wherein the poly(N-acyl)alkylenimine consists essentially of repeating units of the formula

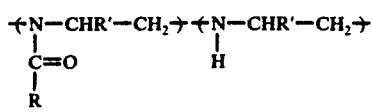

wherein R' is hydrogen or R, and R is an alkyl or an inertly substituted alkyl radical of 1–3 carbon atoms and the combined alkyl carbon content of R and R' does not exceed 4 carbon atoms.

9. The method of claim 8 wherein R' is hydrogen.

10. The method of claim 9 wherein R is ethyl or propyl.

11. The method of claim 10 wherein the poly(N-acyl)alkylenimine is poly(N-propionyl)ethylenimine.

12. The method of claim 11 wherein the latex paint is based upon polymeric esters of acrylic and/or methacrylic acid.

* * * * *